(12) United States Patent
Tirel et al.

(10) Patent No.: US 11,554,700 B2
(45) Date of Patent: Jan. 17, 2023

(54) VEHICLE SEAT

(71) Applicant: FAURECIA Sièges d'Automobile, Nanterre (FR)

(72) Inventors: Johan Tirel, La Selle la Forge (FR); Damien Grimaud, Caligny (FR); Mathieu Chauffray, Athis-de-l'Orne (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/241,272

(22) Filed: Apr. 27, 2021

(65) Prior Publication Data
US 2021/0331606 A1    Oct. 28, 2021

(30) Foreign Application Priority Data

Apr. 28, 2020   (FR) ...................................... 2004194

(51) Int. Cl.
*B60N 2/68*    (2006.01)
*B60N 2/22*    (2006.01)

(52) U.S. Cl.
CPC    *B60N 2/68* (2013.01); *B60N 2/22* (2013.01)

(58) Field of Classification Search
CPC ...................................................... B60N 2/68
See application file for complete search history.

(56) References Cited

U.S. PATENT DOCUMENTS

| 8,267,479 B2 | 9/2012 | Yamada |
| 2005/0200184 A1 | 9/2005 | Siegrist |
| 2016/0347223 A1 | 12/2016 | Akaike |
| 2018/0170226 A1* | 6/2018 | Furukawa ................ B60N 2/20 |
| 2018/0334065 A1* | 11/2018 | Suzuki ..................... B60N 2/68 |
| 2019/0217757 A1* | 7/2019 | Kato ...................... B60N 2/682 |
| 2021/0245636 A1* | 8/2021 | Osa ........................ B60N 2/682 |

FOREIGN PATENT DOCUMENTS

| DE | 102008038851 A1 * | 2/2010 | .............. B60N 2/68 |
| DE | 102014202562 A1 * | 8/2014 | .............. B60N 2/68 |
| DE | 202021105805 U1 * | 1/2022 | |
| EP | 2210772 A1 | 7/2010 | |

(Continued)

OTHER PUBLICATIONS

French Search Report for French App. No FR2004194 dated Dec. 23, 2020, BET210068 FR, 8 pages, (No English Translation Available).

*Primary Examiner* — Timothy J Brindley
(74) *Attorney, Agent, or Firm* — Barnes & Thornburg LLP

(57) ABSTRACT

The vehicle seat comprising a seat-bottom frame; a seatback frame comprising at least one first lateral riser mounted pivoting relative to said seat-bottom frame around a transverse axis; a first discontinuous type hinge mechanism with a first side-plate rigidly fixed to the seat-bottom frame and a second side-plate; an intermediate riser mounted on the seat bottom frame, pivoting around the transverse axis, by means of the first hinge mechanism where the intermediate riser and the second side-plate are securely connected in rotation around the transverse axis; where the intermediate riser is fixed to the first lateral riser at a distance from the transverse axis; where the intermediate riser has a stiffness less than the stiffness of the first lateral riser of the seatback frame.

10 Claims, 11 Drawing Sheets

(56) References Cited

FOREIGN PATENT DOCUMENTS

| | | | | |
|---|---|---|---|---|
| JP | 2003061777 A | * | 3/2003 | ............... B60N 2/22 |
| JP | 2015116950 A | * | 6/2015 | ............... B60N 2/68 |
| JP | 2018127082 A | * | 8/2018 | ............... B60N 2/22 |
| KR | 20120075223 A | * | 2/2012 | |
| WO | WO-2015016351 A1 | * | 2/2015 | ............... B60N 2/68 |
| WO | WO-2015076265 A1 | * | 5/2015 | ............... B60N 2/68 |
| WO | WO-2018139384 A1 | * | 8/2018 | ............... B60N 2/06 |
| WO | WO-2020201017 A1 | * | 10/2020 | |

* cited by examiner

VEHICLE SEAT

PRIORITY CLAIM

This application claims priority to French Application No. 2004194, filed Apr. 28, 2020, which is expressly incorporated by reference herein.

BACKGROUND

The present disclosure relates to the field of vehicle seats, in particular for automotive vehicles.

SUMMARY

According to the present disclosure, a vehicle seat, in particular for an automotive vehicle, comprises a seat-bottom frame; a seatback frame comprising at least one first lateral riser, where said lateral riser is mounted pivoting relative to said seat-bottom frame around a transverse axis; and a first discontinuous type hinge mechanism interposed between the seat-bottom frame and the seatback frame with a first side-plate rigidly fixed to the seat-bottom frame and a second side-plate.

In illustrative embodiments, the seatback frame comprises an intermediate riser mounted on the seat-bottom frame, pivoting around the transverse axis, by means of the first hinge mechanism in order to allow an adjustment of an angular position of the seatback frame relative to the seat-bottom frame around the transverse axis; where the intermediate riser and the second side-plate of the first hinge mechanism are securely connected in rotation around the transverse axis; where the intermediate riser is fixed to the first lateral riser away from the transverse axis; where the intermediate riser has a stiffness less than the stiffness of the first lateral riser of the seatback frame, said stiffness being considered in response to the application of a torque around the transverse axis.

Thus, in the case of not locking, or partial locking, of one of the hinge mechanisms due to an angular offset between the first and the second side-plates, the intermediate riser, having a lesser stiffness, can be slightly deformed, because of the restoring system internal to the articulation mechanism, in order to bring the first and second side-plate in a correct positioning so as to fully lock the hinge mechanism. Further, it is possible to ensure the full locking of the articulation mechanism regardless the stiffness of the seatback frame. Note that the angular offset rectification being discussed is small, i.e. of the order of 1°.

The intermediate riser can be adapted for being rotationally deformed around the transverse axis in response the application of a torque around the transverse axis.

Thus, the restoring system internal to the hinge mechanism, combined with a reduced force from the occupant of the seat allows to make up the angular offset and thus to fully lock the hinge mechanism that was not yet fully locked. In particular, the occupant of the seat can easily exert such a moderate torque when their back is resting on the seatback frame.

The intermediate riser may be deformable between: a rest configuration in which the intermediate riser extends along a main direction of rectilinear extension in a first plane normal to the transverse axis; a deformed configuration in which a first portion of the intermediate riser, preferably located near the transverse axis, is flexed in a first plane normal to the transverse axis in response to the application of the torque around the transverse axis.

Such a bending of the intermediate riser in the first plane normal to the transverse axis allows the restoring system inside the not yet fully locked hinge mechanism to rotate the second side-plate relative to the first side-plate around the transverse axis in order to correct a possible angular offset between the second side-plate and the first side-plate compared to a relative locking position.

The intermediate riser may have, near the intermediate portion, a reduced dimension in a direction normal to the transverse axis and to the main direction of extension of the intermediate riser.

The reduced dimension near the first portion allows to improve the bending of the intermediate riser near this first portion. This also allows to induce a preferred direction of deformation of the intermediate riser, in particular in the first plane normal to the transverse axis.

In the deformed configuration, a second portion of the intermediate riser, located away from the transverse axis, can have a main direction of extension forming a bending angle with the main direction of extension of the intermediate riser in the rest configuration, where the bending angle is preferably included between 0° and 1°.

Such values allow sufficient rotation, around the transverse axis, of the second side-plate relative to the first side-plate in order to allow the full locking of the not yet fully locked hinge mechanism for any angular offset between the first side-plate and the second side-plate relative to the locking position. That also allows to avoid plastic deformation of the intermediate riser.

The stiffness in the intermediate riser, considered in response to a torque around the transverse axis, is less than or equal to 50 N·m·deg$^{-1}$.

Such a stiffness allows an easy deformation of the intermediate riser by an occupant of the seat. Such a stiffness is below the stiffness usually observed for the seat frame itself, in particular for large seatbacks, e.g. seatbacks for delivery vans or trucks.

The intermediate riser can be fixed at an upper end portion to the first lateral riser, and at a lower-end portion to the second side-plate of the first hinge mechanism.

In that way, distance between the attachment of the intermediate riser to the first lateral riser end of the first transverse axis is the highest. Because of that arrangement, the torque necessary for deforming the intermediate riser is reduced because of the large lever arm.

The intermediate riser may be fixed to the first lateral riser by welding.

The weld constitutes a robust and durable attachment means.

The first lateral riser may form a housing in which the intermediate riser is received.

Such a riser allows to keep a reduced bulk of the frame of the seatback in particular along the transverse direction Y.

In the resting configuration, the intermediate riser may be received in the housing of the first lateral riser with a clearance formed between the intermediate riser and a wall of the housing of the first lateral riser, in a direction normal to the transverse axis and to the main direction of extension of the intermediate riser.

The clearance formed allows the intermediate riser to be deformed inside the housing of the first lateral riser, with the wall of the housing forming a limit stop for deformation of the intermediate riser. Because of this limit by stops, the bending angle of the intermediate riser can remain in the elastic domain.

The first and second side-plates of the first hinge mechanism can be connected through at least one peripheral toothing (gearing).

The intermediate riser may have a hole centered on the transverse axis, where the second side-plate is received at least in part in the hole of the intermediate riser and where the intermediate riser forms a plurality of pins extending to the inside of the hole and engaging by complementary of shapes with the relief of the second side-plate in order to secure the intermediate riser and the second side-plate in rotation around the transverse axis.

The seatback frame may further comprise a second lateral riser, where the second lateral riser is mounted pivoting relative to the seat-bottom frame, around the transverse axis by means of a second hinge mechanism.

In other words, the second lateral riser may not have an intermediate riser, meaning a single intermediate riser may suffice. However, having an intermediate riser on each side is not excluded.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
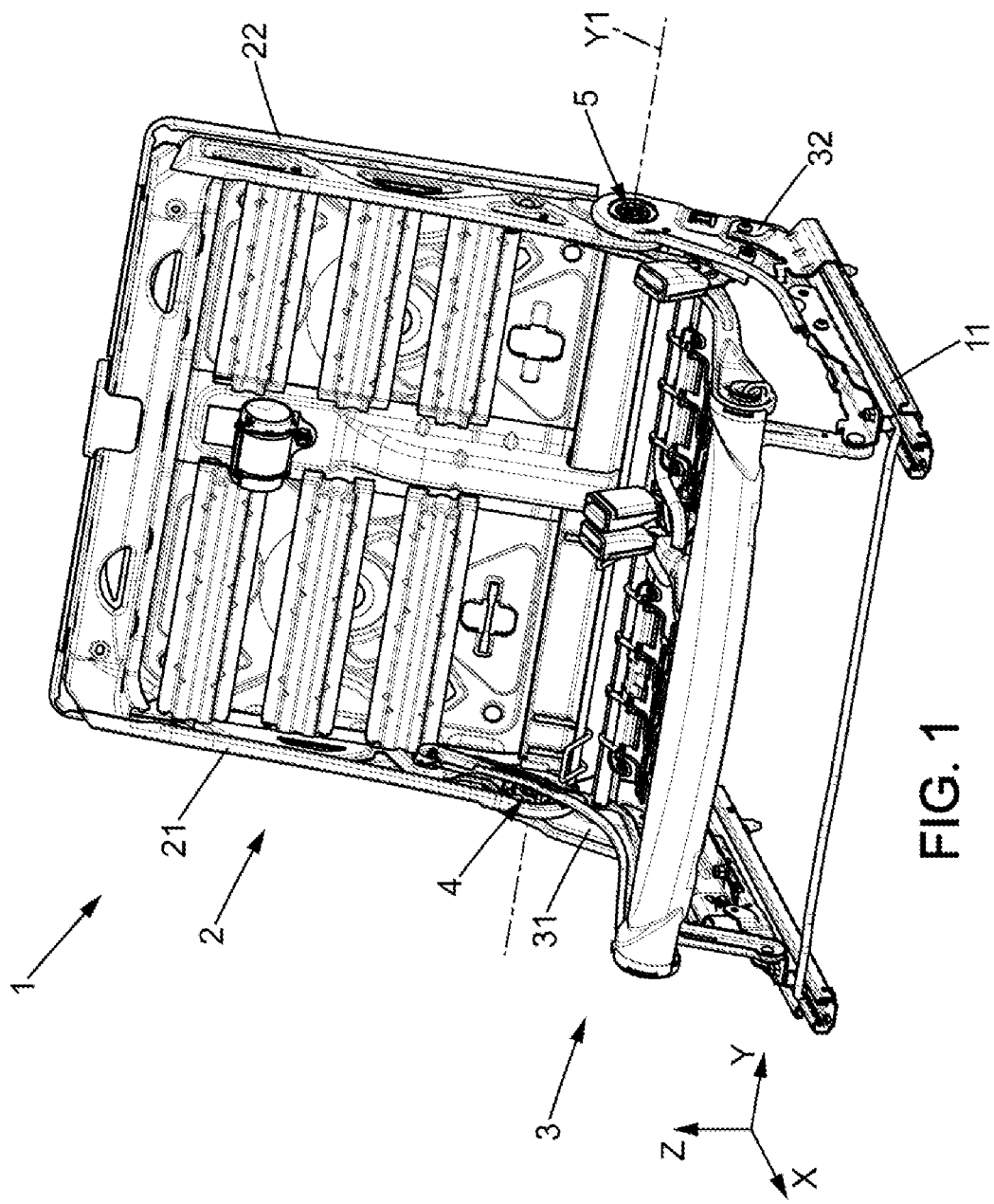
FIG. 1 shows a perspective view of a vehicle seat.
Figure 3:
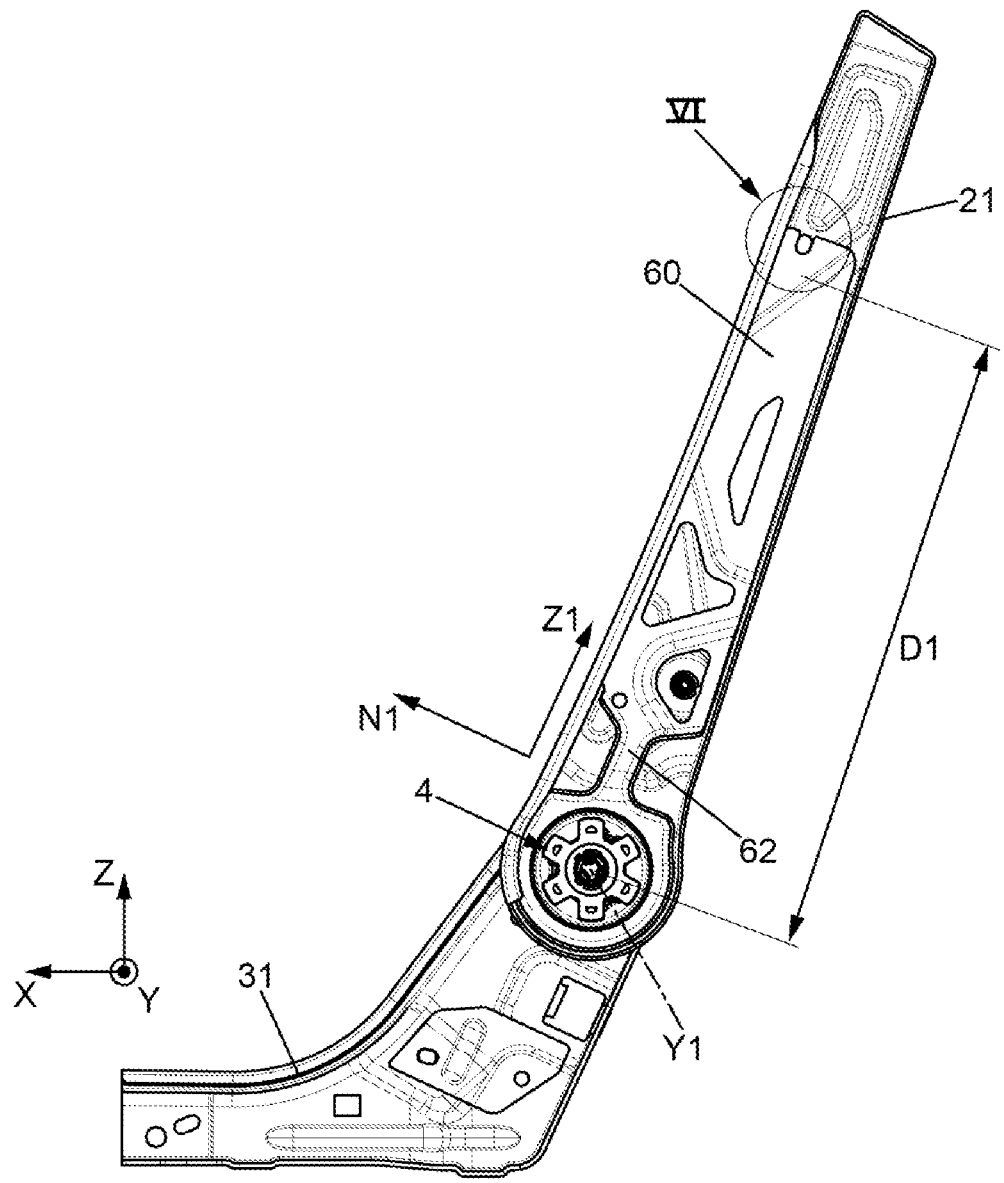
FIG. 3 shows the side view of a subassembly of the seat from FIG. 1.
Figure 4:
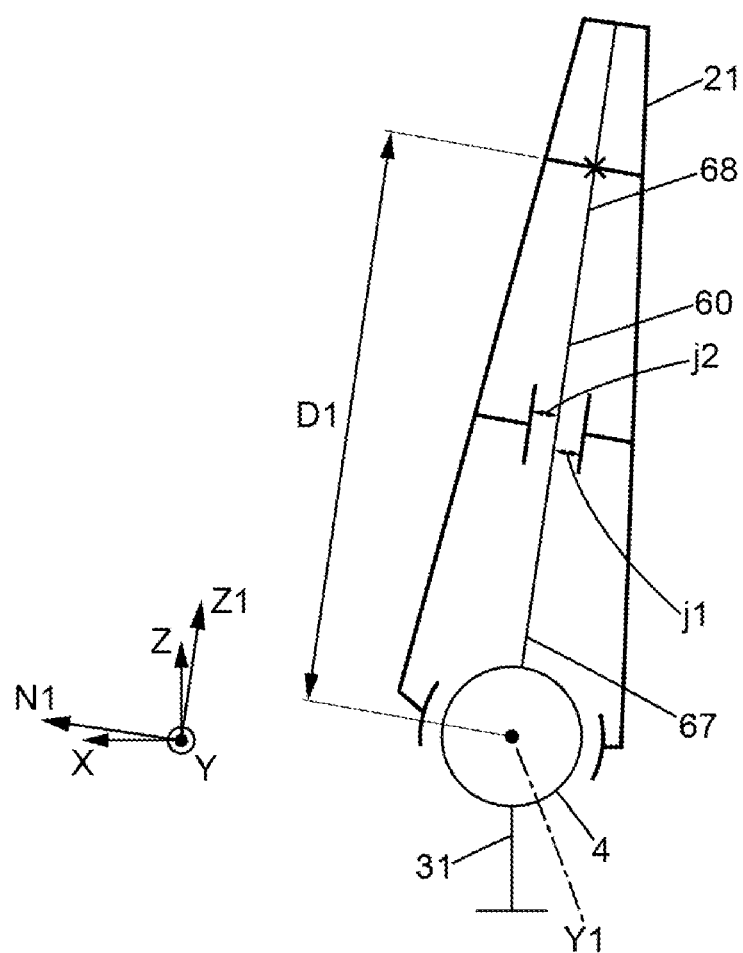
Figure 5:
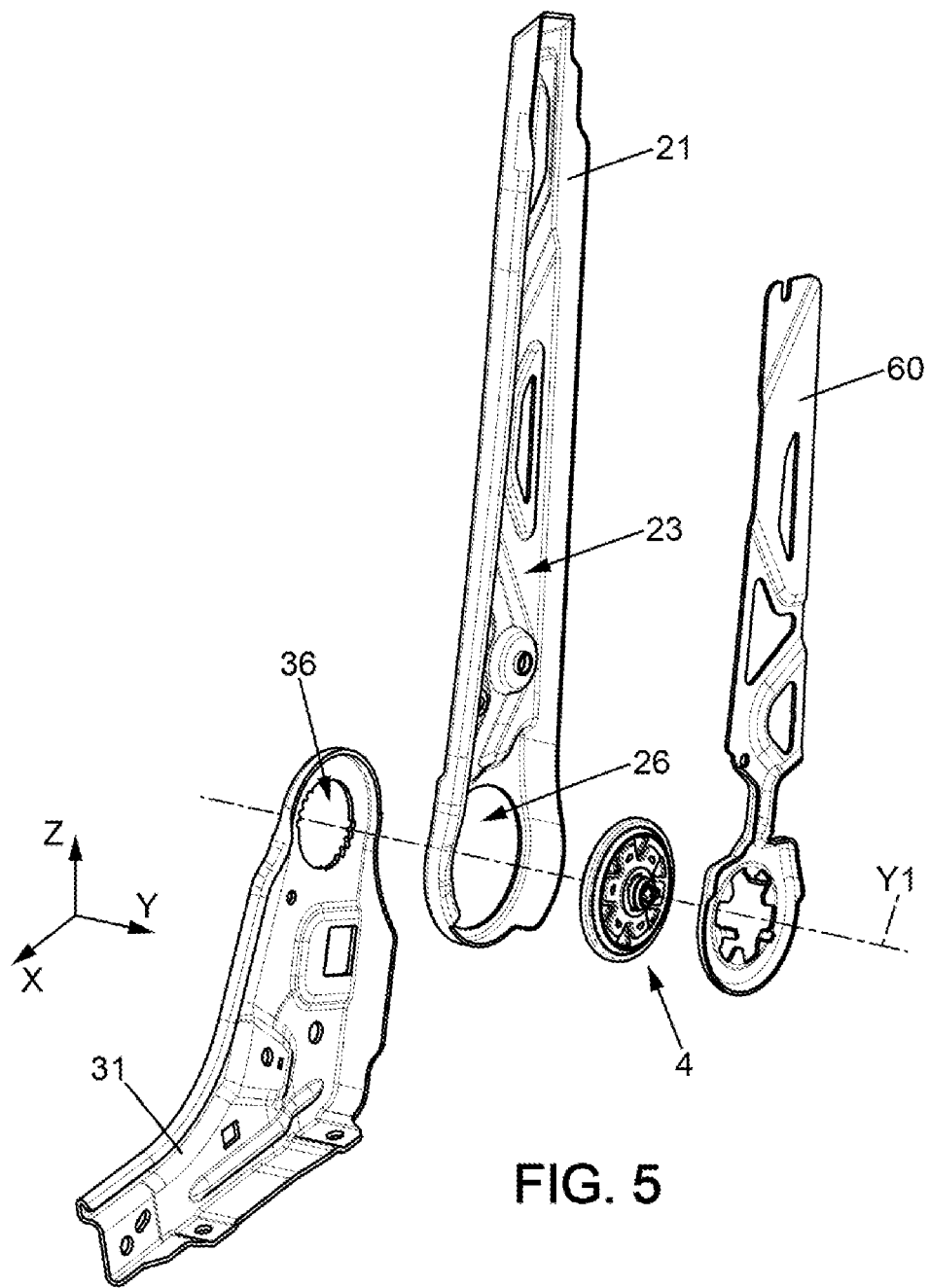
Figure 6:
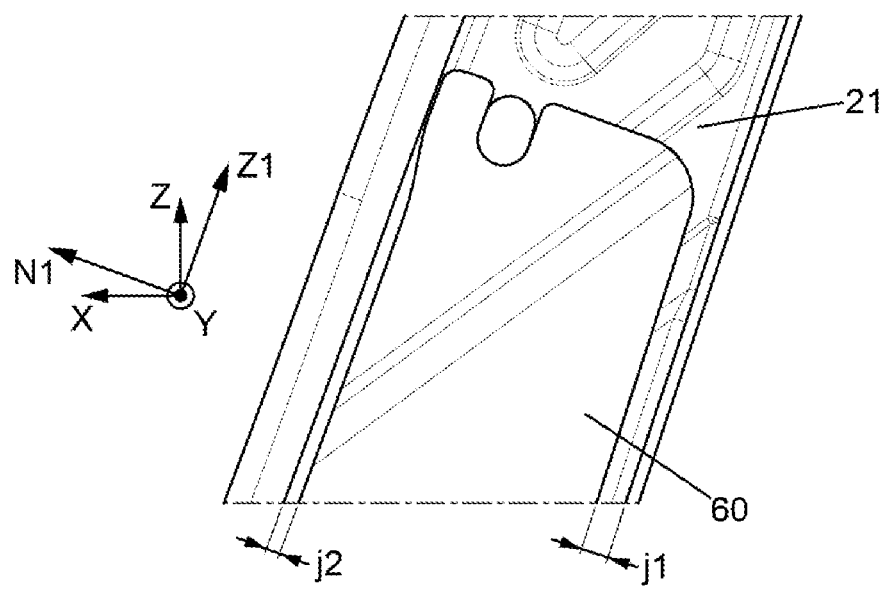
Figure 7:
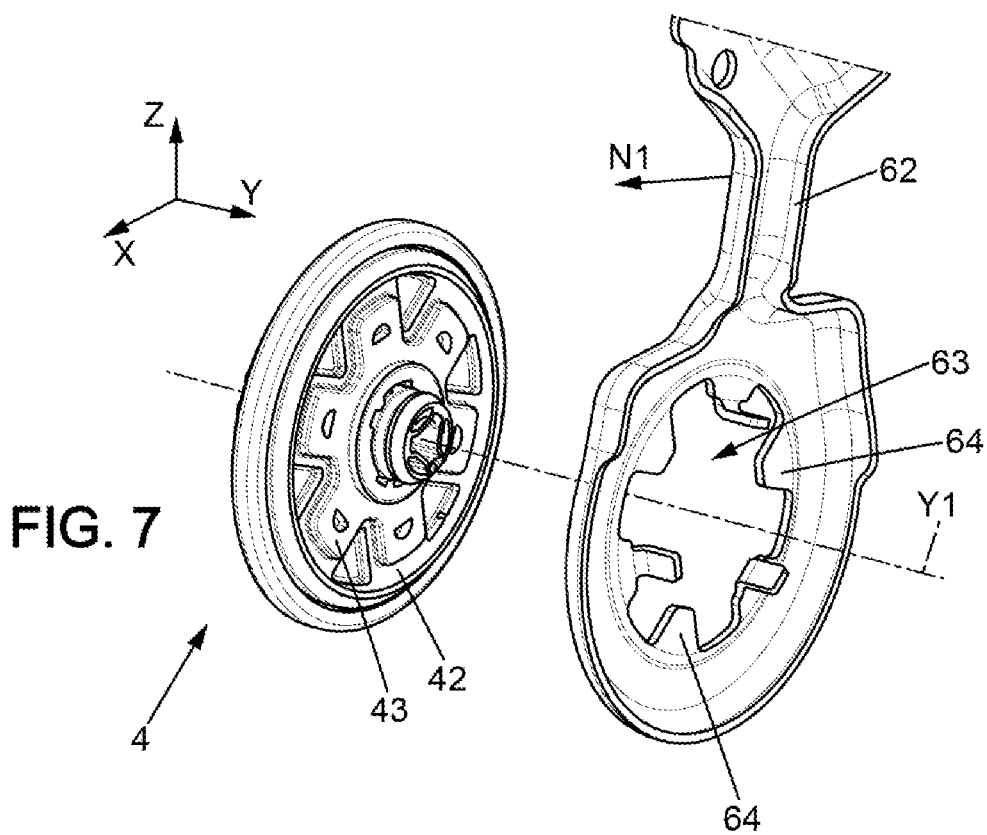
Figure 8A:
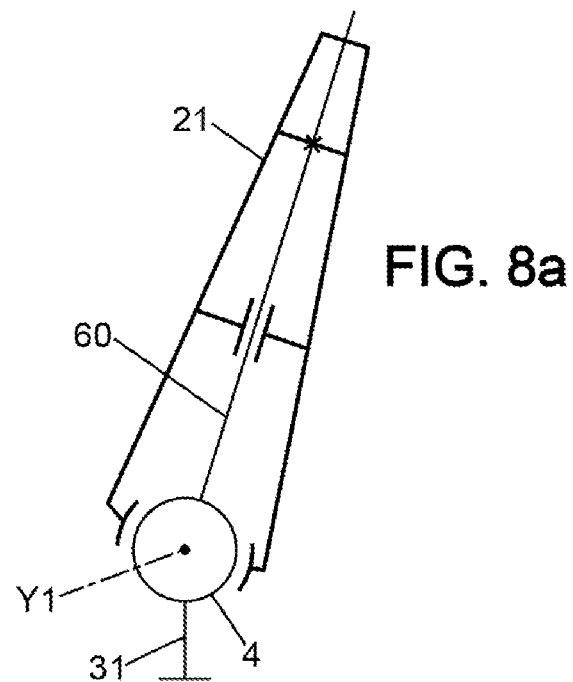
Figure 8B:
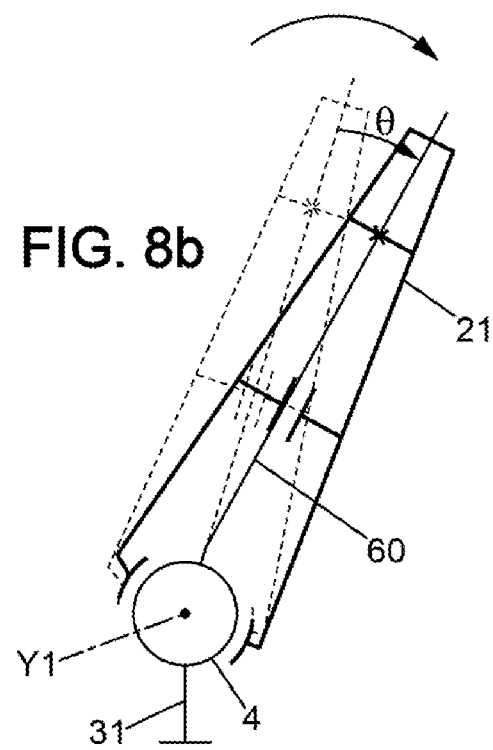
Figure 8C:
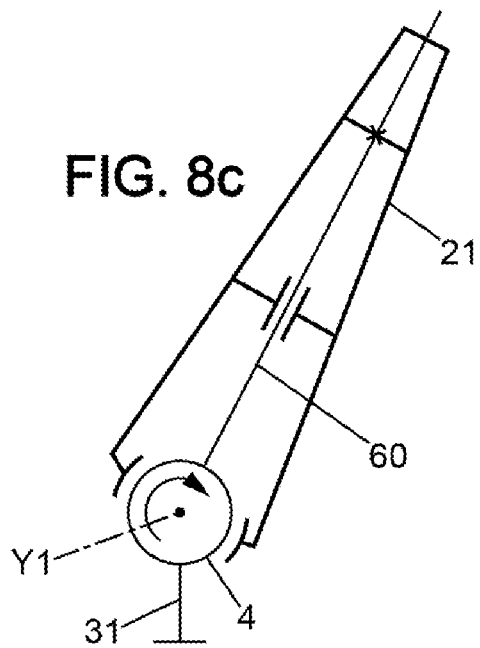

FIG. 4 schematically shows a side view of the subassembly from FIG. 3;

FIG. 5 shows an exploded view in perspective of the subassembly from FIG. 3;

FIG. 6 shows in side view a detailed subassembly from FIG. 3;

FIG. 7 shows a partial exploded view in perspective of the intermediate riser and the hinge mechanism of the subassembly from FIG. 3;

FIG. 8a, FIG. 8b, and FIG. 8c schematically shown side views of the subassembly from FIG. 3 in successive configurations from a first scenario; and FIG. 9a, FIG. 9b, FIG. 9c, and FIG. 9d schematically shown side views of each lateral riser from the seatback frame of the seat from FIG. 1 relative to the seat-bottom frame in successive configurations from a second scenario.

DETAILED DESCRIPTION

In the following description, when referring to absolute position qualifiers, such as the terms "front," "rear," "top," "bottom," "left," "right," etc., or relatives such as the terms "above," "below,", "upper," "lower," etc. or orientation qualifiers, such as "horizontal," "vertical," etc., unless indicated otherwise refer to the orientation of the figures or of a seat in the normal position of use thereof.

In the remainder, the longitudinal direction X means the longitudinal direction of the seat. The longitudinal direction of the seat is considered to be the same as the longitudinal direction of the automotive vehicle in which the seat is mounted. This longitudinal direction X corresponds to the normal direction of forward motion of the vehicle. The longitudinal direction X is preferably horizontal. The transverse direction Y is the transverse direction of the seat. The transverse direction of the seat thus corresponds to the transverse or lateral direction of the automotive vehicle. This transverse direction Y corresponds to a direction perpendicular to the normal direction of forward motion of the vehicle. The transverse direction Y is preferably horizontal. Finally the vertical direction Z is a vertical direction of the seat, perpendicular to the longitudinal X and transverse Y directions.

FIG. 1 shows a perspective view of a vehicle seat 1 in particular an automotive vehicle. The seat 1 comprises a seat bottom with a seat-bottom frame 3. The seat bottom 3 comprises a first lateral support 31 and a second lateral support 32. In the example shown, the seat-bottom frame 3 also comprises a seat bottom crosspiece extending in the transverse direction Y, between the lateral supports 31, 32. Here the seat bottom crosspiece is a front crosspiece. In fact, the seat bottom crosspiece is fixed onto the front end portions of the first and second lateral supports 31, 32 of the seat-bottom frame 3.

The seat-bottom frame 3 has an upper surface intended to be in contact with the butt/legs of an occupant of the seat 1 through a finish at least partially covering the seat-bottom frame 3. The seat 1 is mounted, via the seat-bottom frame 3, onto a slider 11 for movement of the seat 1 in the longitudinal direction X.

The seat 1 also comprises a seat back with a seatback frame 2. The seatback frame 2 comprises a first lateral riser 21 and a second lateral riser 22. The seatback frame 2 here comprises a seatback crosspiece. Here the seatback crosspiece is an upper crosspiece. In fact, the seatback crosspiece is fixed onto the upper end portions of the first and second lateral risers 21 and 22.

The seatback frame 2 has a front surface. The front surface of the seatback frame 2 is intended to be in contact with the back of an occupant of the seat 1 via trim at least partially covering the seatback frame 2.

In the example shown, note that seatbelt attachment points are on the seatback (two locking loops in middle bottom and a winder in upper median position). This involves a substantial stiffness of the seatback in order to take up the forces transmitted by the belt(s).

The seatback frame 2 is here mounted pivoting relative to the seat-bottom frame 3, around a transverse axis Y1. In particular, the first lateral riser 21 is mounted pivoting about the transverse axis Y1 relative to the first lateral support 31. Similarly, the second lateral riser 22 is mounted pivoting about the transverse axis Y1 relative to the second lateral support 32.

To do that, the first and second risers 21, 22 are mounted pivoting relative to the first and second lateral supports 31, 32 by means of a corresponding first and second hinge mechanism 4, 5. The hinge mechanisms 4, 5 are each discontinuous type.

Figure 2:
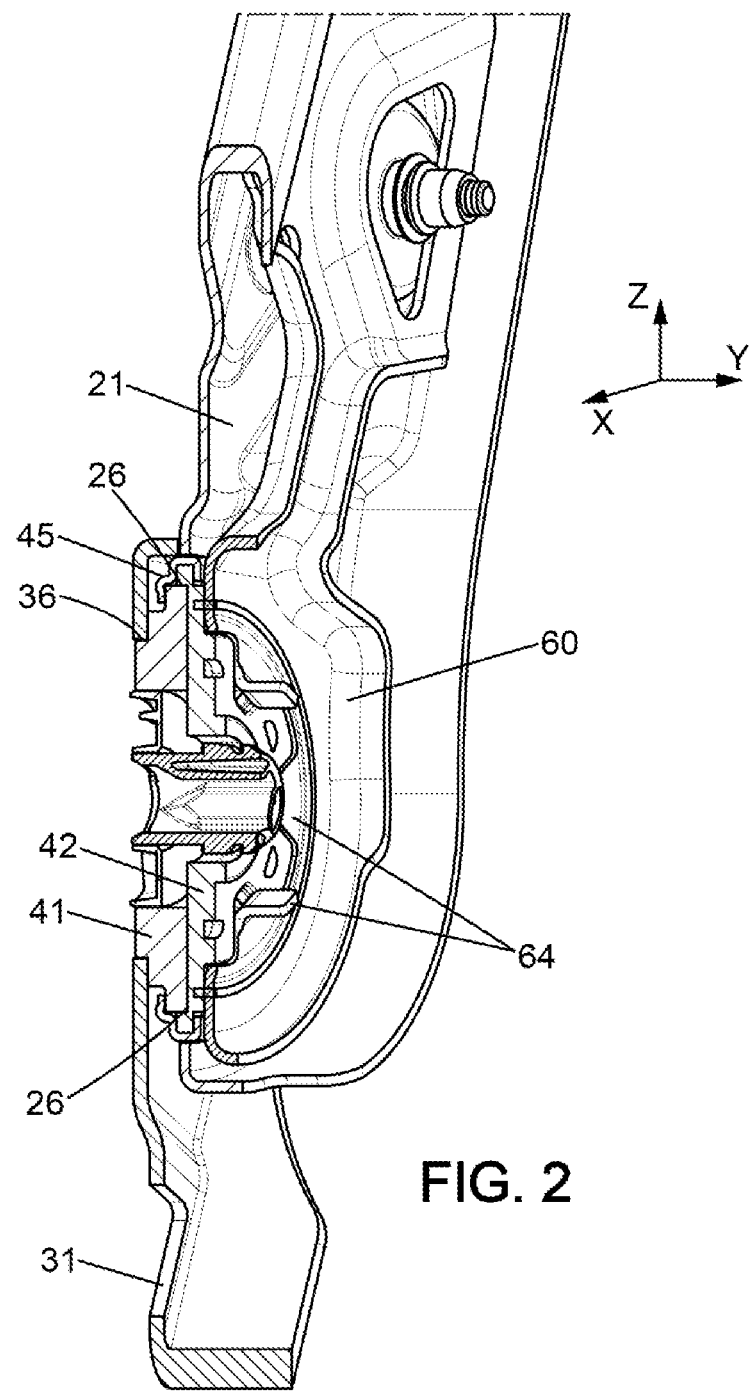
FIG. 2 shows a partial view in section and perspective of the hinge mechanism from the seat from FIG. 1.

The first hinge mechanism comprises a first side-plate 41 and a second side-plate 42 visible in FIG. 2. The first side-plate 41 and the second side-plate 42 of the hinge mechanism 4 are connected through at least one peripheral toothing. As is known, an annular gear may comprise such peripheral toothing in which locking elements are arranged to come engage therein. Here, the annular gear is secured to the first side-plate 41. The locking elements are secured in rotation relative to the second side-plate 42 around the transverse axis Y1. The locking elements are in particular movable and guided relative to the second side-plate 42 in a radial movement relative to the transverse axis Y1. When the teeth of the locking elements are engaged in the tooth bottom of the annular gear then the locking is called complete. Further, the first hinge mechanism 4 conventionally comprises an internal restoring system for keeping, in the absence compressive force, the teeth of the locking elements engaged in the toothing of the annular gear.

The second hinge mechanism 5 is identical to the first hinge mechanism 4, but placed symmetrically about a plane comprising the longitudinal X and vertical Z directions, median to the seat 1.

In the remainder of the description, more specific interest is given to the pivoting mounting between the first lateral riser 21 and the first lateral support 31.

As shown in FIGS. 3 and 4, the seat 1 comprises an intermediate riser 60. The intermediate riser 60 extends here mainly in a first plane normal to the transverse axis Y1. The intermediate riser has a main direction of extension Z1 in the first plane normal to the transverse axis Y1, comprising at least one component along the vertical direction Z. The main direction of extension Z1 of the intermediate riser 60 corresponds, in FIGS. 3 and 4, to a main direction of extension of the first lateral riser 21. The intermediate riser 60 extends between a lower-end portion 67 and an upper end portion 68. The intermediate riser 60 is made of stamped sheet-metal.

Further, the intermediate riser 60 has, near a first portion 62, a reduced dimension in a direction N1 normal to the transverse axis Y1 and to the main direction of extension Z1. The first portion 62 is located near the transverse axis Y1. It will be noted here that the normal direction N1 corresponds to a direction normal to the front surface of the seatback frame 2. The reduced dimension near the first portion 62 serves to enhance the bending of the intermediate riser 60, in the first plane normal to the transverse axis Y1 near this first portion, as will be described later.

This intermediate riser 60 has a stiffness (also called mechanical stiffness), considered in response to a torque around the transverse axis Y1, less than a stiffness of the first lateral riser 21 of the seatback frame 2. The intermediate riser 60 may have such a stiffness solely near the first portion 62. The stiffness of the intermediate riser 60, in response to a torque around the transverse axis Y1 may be less than or equal to 50 N·m·deg$^{-1}$. In comparison, the stiffness of the first lateral 21 may be equal to 200 N·m·deg$^{-1}$.

The intermediate riser 60 is fixed to the first lateral riser 21 at a distance D1 from the transverse axis. Here, the intermediate riser 60 is fixed to the first lateral riser 21, at an upper end portion. The intermediate riser 60 is in particular welded to the first lateral riser 21.

The first lateral riser 21 further forms a housing 23, visible in FIG. 5. The housing 23 extends in the direction of the transverse axis Y1. The intermediate riser 60 is here received in the housing 23 of the first lateral riser 21.

The intermediate riser 60 is received in the housing 23 of the first lateral riser 21 with a clearance formed between the intermediate riser 60 and a wall for the housing 23 of the first lateral riser 21 and the normal direction N1. In that way, a rear clearance j1 can be formed between the intermediate riser 60 and a rear wall of the housing 23 of the first lateral riser 21 where this can be seen in more detail in FIG. 6. Also, a front clearance j2 also visible in FIG. 6 can be formed between the intermediate riser 60 and a front wall of the housing 23 of the first lateral riser 21. Such clearance allows in particular a deformation of the intermediate riser inside the housing 23. Thus, in this case, the front and rear walls of the housing 23 each respectively form a front and rear stop limiting deformation of the intermediate riser 60.

As shown in FIG. 2, the intermediate riser 60 is mounted on the first lateral support 31 of the seat-bottom frame 3 pivoting around the transverse axis Y1. For this purpose, the first side-plate 41 of the first hinge mechanism 4 is rigidly attached to the first lateral support 31 of the seat-bottom frame 3, in particular inside a first opening 36 of the lateral support 31. The second side-plate 42 of the hinge mechanism 4 is connected to the intermediate riser 60 secured in rotation around the transverse axis Y1. In other words, the relative rotation between the second side-plate 42 and the intermediate riser 60, around the transverse axis Y1 is blocked. The second side-plate 42 of the hinge mechanism 4 is here connected to a lower-end portion of the intermediate riser 60.

Referring to FIG. 7, the intermediate riser 60 has a hole 63 centered on the transverse axis Y1. The intermediate riser 60 forms a plurality of pins 64 extending inside the hole. The second side-plate 42 is in part received in the hole 63 of the intermediate riser 60 such that the reliefs 43 of the second side-plate 42 engage by complementary shape with the pins 64 in order to secure the intermediate riser 60 and the second side-plate 42 in rotation around the transverse axis Y1. Alternatively or additionally, the second side-plate 42 may also be welded to the intermediate riser 60.

Further, the first lateral riser 21 is mounted pivoting freely around the transverse axis Y1, relative to the first lateral support 31 of the seat-bottom frame 3. In fact, the first lateral riser 21 comprises a second circular opening 26, centered on the transverse axis Y1, in which the first hinge mechanism 4, in particular the outer ring or ferrule 45, is in part received. Thus, the first lateral riser 21 is mounted pivoting relative to the lateral support 31, around the transverse axis, via the intermediate riser 60. In other words, the adjustment of an angular position of the first lateral riser 21 of the seatback frame 2 relative to the seat-bottom frame 3 around the transverse axis Y1 is controlled by the locking of an angular position of the intermediate riser 60 relative to the first lateral support 31.

The second lateral riser 22 is mounted pivoting relative to the second lateral support 32 of the seat-bottom frame 3, around the transverse axis Y1 by means of the second hinge mechanism 5. For this purpose, a first side-plate of the second hinge mechanism 5 is rigidly attached to the second lateral support 32 of the seat-bottom frame 3. A second side-plate of the second hinge mechanism 5 is connected to the second lateral riser 22 secured in rotation around the transverse axis Y1. In other words, the second lateral riser 22 does not have any intermediate riser.

FIG. 8a shows the first lateral riser 21 of the seatback frame 2 in an angular position, selected by an occupant of the seat, relative to the first lateral support 31 of the seat-bottom frame 3 in a first scenario.

In the first scenario, the first hinge mechanism 4 is not fully locked whereas the second hinge mechanism 5 is fully locked. In other words, the first side-plate 41 of the first hinge mechanism 4 is angularly offset relative to the second side-plate 42 of the first hinge mechanism 4, such that the teeth of the locking elements are not at the bottom of teeth of the annular gear. For example, the teeth of the locking elements may be partially engaged in the teeth of the annular gear, producing only a partial locking of the first hinge mechanism 4. In the worst case, the locking elements and the annular gear are in a position called "tooth on tooth," in which case there is no locking between the first and second side-plates 41 and 42 of the first hinge mechanism 4.

Remarkably, the intermediate riser 60 is, in FIG. 8a, in a rest configuration, in which the main extension direction Z1 of the intermediate riser 60 is straight in the first plane normal to the transverse axis Y1.

In that way, in the case of partial locking or not locking, of the first hinge mechanism 4, the torque around a transverse axis Y1 may be exerted, on the seatback frame 2, either by an occupant of the seat 1, for example by means of their back pressing on the front surface of the seatback frame 2 or by a force of inertia, for example produced by the acceleration of the vehicle. Such a torque produces a pivoting of the first lateral riser 21 around the transverse axis Y1 as shown in FIG. 8b. Here, it involves a backward rotation of the first lateral riser 21. Alternatively, the torque around the transverse axis Y1 may be opposed so as to produce a forward rotation of the first lateral riser 21.

The torque around the transverse axis Y1 is then transmitted to the intermediate riser 60 because the first lateral riser 21 is rigidly attached to the intermediate riser 60. The lower end portion of the intermediate riser 60 is held in rotation, around the transverse axis Y1 by means of the second side-plate 42 of the first hinge mechanism 4. Thus, a deformation in rotation around the transverse axis Y1 of the intermediate riser 60 is produced in response to the torque around the transverse axis Y1. In fact, the intermediate riser 60, having a low stiffness, can be easily deformed in response to the torque exerted around the transverse axis Y1.

The intermediate riser 60 is then deformed into a deformed configuration in which the first portion 62 of the intermediate riser 60 is deformed by bending in the first plane normal to the transverse axis Y1 in response to the application of the torque around the transverse axis Y1. The deformation of the intermediate riser 60 may be elastic. In particular, only the first portion 62 can be deformed by bending in the first plane normal to the transverse axis Y1 in response to the application of the torque around the transverse axis Y1.

In the deformed configuration, a second portion of the intermediate riser 60, located away from the transverse axis Y1, has a main direction of extension forming a bending angle $\theta$ with the main direction of extension Z1 of the intermediate riser in the rest configuration. The second portion of the intermediate riser 60 may be an upper portion of the intermediate riser.

Such a bending of the intermediate riser 60 in a first plane normal to the transverse axis, combined with the internal restoring system of the first hinge mechanism 4 allows a rotation of the second side-plate 42 relative to the first side-plate 41 around the transverse axis Y1 as shown in FIG. 8c. It is then possible to make up the initial angular offset between the first and second side-plates 41, 42 of the first hinge mechanism 4 in order to bring them into phase so as to fully lock the first hinge mechanism 4. It is then possible to assure the full locking of the first articulation mechanism 4 whatever the stiffness of the seatback frame.

The front and rear stops formed by the housing 23 of the first lateral riser 21 define an end of range of the deformation, forward or backward, of the intermediate riser 60. The rear j1 and front j2 clearances, between the intermediate riser 60 on one hand and the corresponding front and rear walls of the housing 23 on the other, allow a deformation of the intermediate riser 60 such that the bending angle $\theta$, formed in the deformed configuration by the second portion of the intermediate riser, is preferably included between 0° and 1°. It should be noted that the representation of the bending angle $\theta$ in FIGS. 8b and 8e was exaggerated in order to improve understanding. Such values serve to avoid plastic deformation of the intermediate riser 60.

Further such values of the bending angle $\theta$ allow sufficient rotation, around the transverse axis Y1, of the second side-plate 42 relative to the first side-plate 41 in order to allow the full locking of the first hinge mechanism 4 whatever the angular offset between the first side-plate 41 and the second side-plate 42 relative to the locking position. In fact, conventionally, the annular gear of a hinge mechanism comprises a number of teeth included between 100 and 200, which corresponds to a locking step, between two successive full locking positions included between 3.6° and 1.8°.

Further, such a deformation limit of the intermediate riser allows, in case of accident, a take-up of significant forces by the first lateral riser 21 of the seatback frame 2, since it has a higher stiffness, to take up significant forces before rupture of the intermediate riser 60.

Remarkably, the intermediate riser 60 returns to a rest configuration when the first hinge mechanism 4 is fully locked. The torque exerted on the seatback frame 2 can then be discontinued.

Figure 9A:
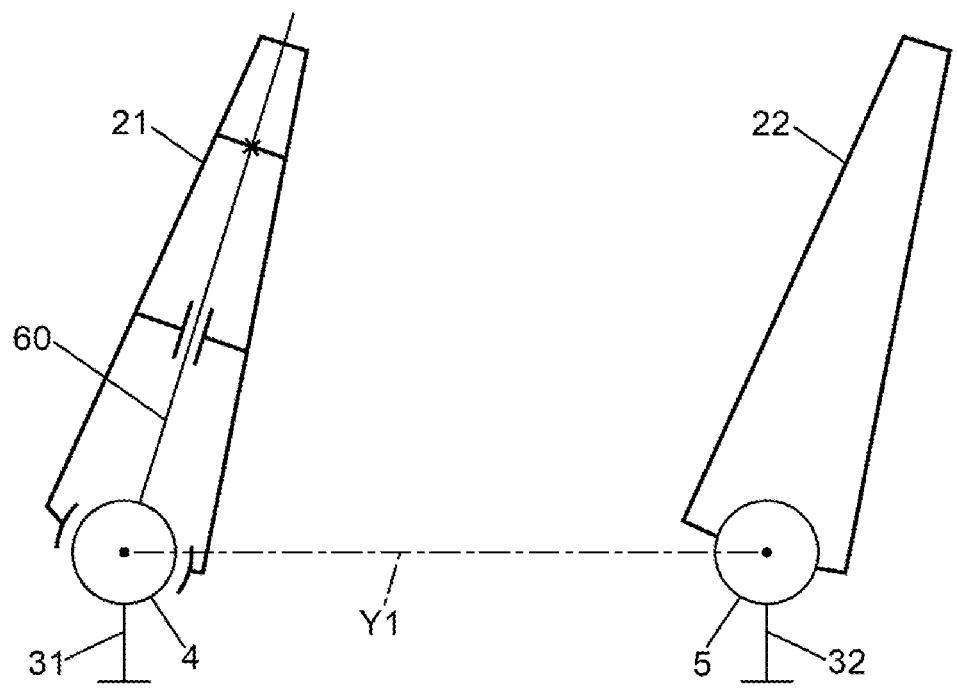

FIG. 9a shows the first and second lateral risers, 21, 22 of the seatback frame 2 again in an angular position, selected by an occupant of the seat, relative to the first and second lateral supports of the seat-bottom frame 3 in a second scenario.

In the second scenario, the second hinge mechanism 5 is not fully locked whereas the first hinge mechanism 4 is fully locked. In other words, the first side-plate of the second hinge mechanism is angularly offset relative to the second side-plate of the second hinge mechanism such that the teeth of the locking elements are not at the bottom of teeth of the annular gear.

Figure 9B:
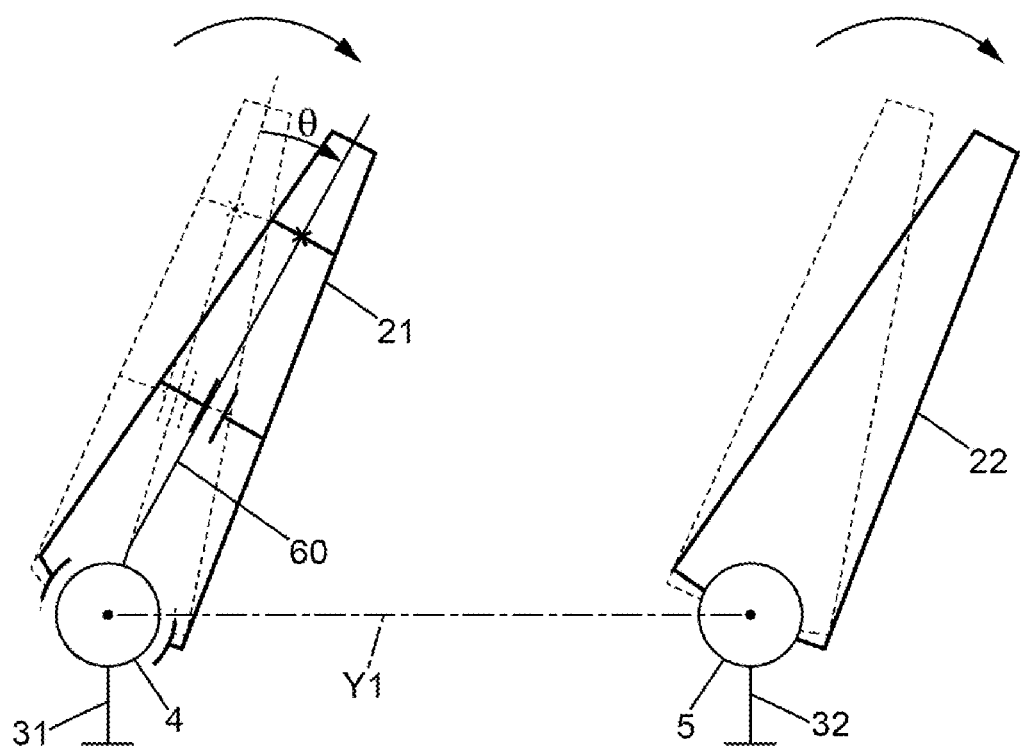

Identically to the first scenario, a torque around the transverse axis Y1 is exerted on the seatback frame 2. The first lateral riser 21 is thus pivoted backward as shown in FIG. 9b (or alternately forward), because of the deformation allowed from the intermediate riser 60 by bending in the first plane normal to the transverse axis Y1.

Thus, because of the stiffness of the seatback frame 2, in particular because of the stiffness of the seatback crosspiece connecting the second lateral riser 22 to the first lateral riser 21, the second lateral riser 22 is also pivoted around the transverse axis in the same direction as the first lateral riser 21.

Figure 9C:
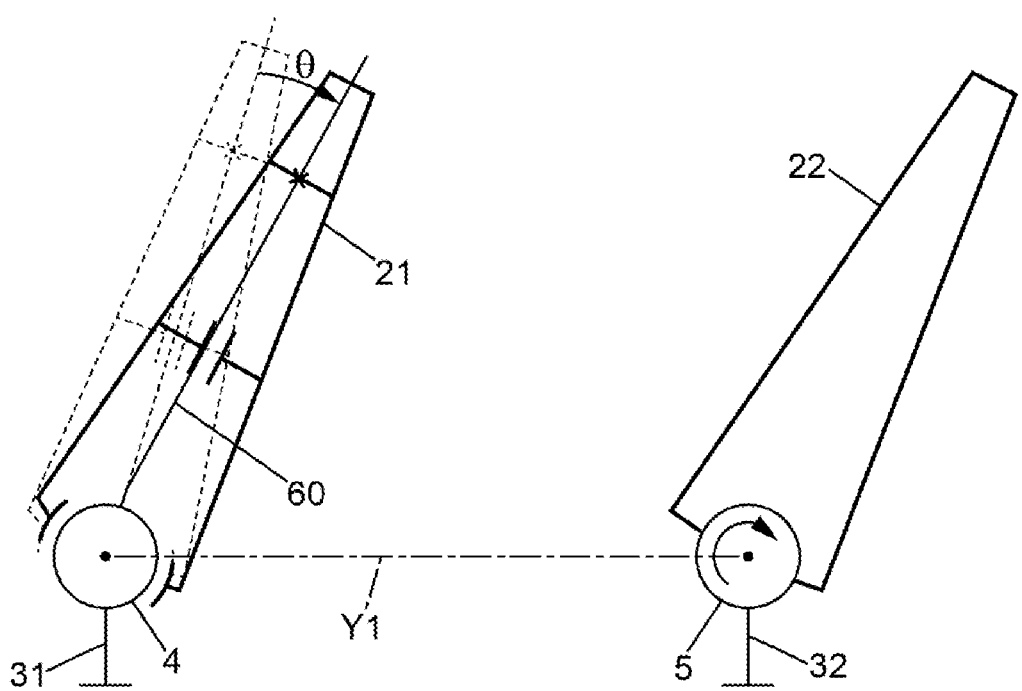

In that way, the pivoting of the second lateral riser 22 around the transverse axis Y1 combined with the inner restoring system of the second hinge mechanism 5 produces a rotation of the second side-plate of the second hinge mechanism 5 relative to the first side-plate of the second hinge mechanism 5 around the transverse axis Y1, as shown in FIG. 9c. It is then possible to make up the initial angular offset between the first and second side-plates of the first hinge mechanism 5 in order to bring them into phase so as to fully lock the second hinge mechanism 5.

The torque exerted on the seatback frame 2 can then be discontinued. In that way, the intermediate riser 60 returns into the rest configuration as shown in FIG. 9d.

Figure 9D:
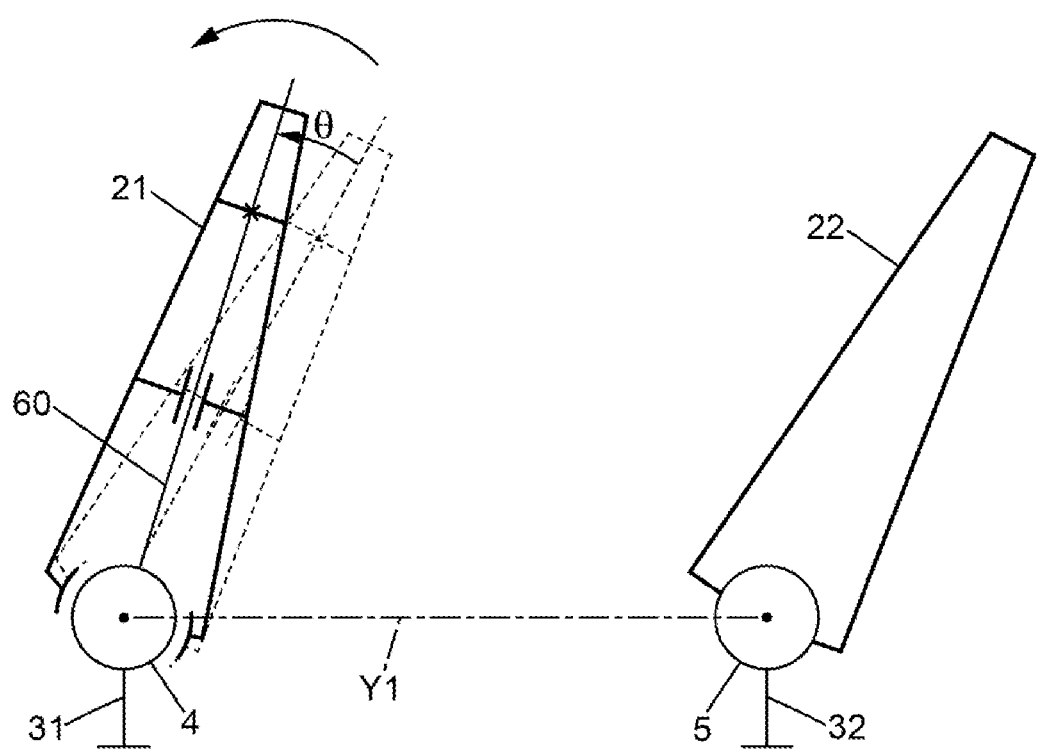

Identically, the rotation of the first and second lateral risers 21, 22 was exaggerated in FIGS. 9b to 9d in order to improve understanding.

Vehicle seats, in particular for automotive vehicles, generally comprise a seatback whose inclination relative to a seat bottom is adjustable around an axis, by means of a hinge system comprising one or two hinge mechanisms. Each hinge mechanism comprises a first side-plate and a second side-plate, where each is securely linked to a seat-bottom frame and a seatback frame.

Two types of hinge mechanisms may be used, specifically continuous and discontinuous.

Continuous hinge mechanisms, comprising, for example, a hypocycloid device, allow locking of the first side-plate relative to the second side-plate for any relative angular position of the seatback compared to the seat bottom.

Discontinuous hinge mechanisms may comprise locking elements that are radially displaceable relative to an annular gear. In an engaged position, where the locking elements are engaged in the toothing of the annular gear, the relative position between the first side-plate and the second side-plate is locked. In that way a mechanism results which can be locked in a large number of discrete locking positions according to the step of the teeth of the annular gear.

The remainder of the document relates in particular vehicle seats comprising two discontinuous type hinge mechanisms.

The vehicle seat generally comprises two discontinuous type hinge mechanisms arranged on the left and right sides of the seat and connected to each other by a linking mechanism commanding the simultaneous locking and unlocking.

It is observed that when trying to unlock the hinge mechanisms of the seat, there can be a slight angular offset between the left side and the right side of the seat such that after locking one hinge mechanism, it can happen that for the other hinge mechanism, and the first and second side-plates of this hinge mechanism are in a relative configuration such that the teeth of the locking elements are not completely engaged in the toothing of the annular gear. Hence, this articulation mechanism is not entirely locked or insufficiently locked (incomplete engagement of the toothing). However, a positive and complete locking of both hinge mechanisms is necessary to provide for the safety of the occupant(s) of the seat. This slight offset between the left and light relocking can be due to a slight twisting of the seatback or to a differential application of force between the left and right sides. This slight angular offset may get even larger as the seat is wider (i.e. seat for two occupants) and/or the seat back includes an attachment point for the seatbelt.

Thus, it is often necessary for the occupant of the seat to exert a forward or backward force for slightly deforming the frame of the seatback allowing the teeth of the locking elements to engage with the toothing of the annular gear and thus fully lock the hinge mechanism which was not yet locked. However, in the case of a seat whose frame has a high stiffness, it can be difficult or even impossible to fully lock the hinge mechanism not yet fully locked.

The present disclosure aims to improve the situation.

Thus, a vehicle seat is proposed, in particular for an automotive vehicle, comprising: a seat-bottom frame; a seatback frame comprising at least one first lateral riser, where said lateral riser is mounted pivoting relative to said seat-bottom frame around a transverse axis; a first discontinuous type hinge mechanism interposed between the seat-bottom frame and the seatback frame with a first side-plate rigidly fixed to the seat-bottom frame and a second side-plate; wherein the seatback frame comprises an intermediate riser mounted on the seat-bottom frame, pivoting around the transverse axis, by means of the first hinge mechanism in order to allow an adjustment of an angular position of the seatback frame relative to the seat-bottom frame around the transverse axis; where the intermediate riser and the second side-plate of the first hinge mechanism are securely connected in rotation around the transverse axis; where the intermediate riser is fixed to the first lateral riser away from the transverse axis; where the intermediate riser has a stiffness less than the stiffness of the first lateral riser of the seatback frame, said stiffness being considered in response to the application of a torque around the transverse axis.

Thus, in the case of not locking, or partial locking, of one of the hinge mechanisms due to an angular offset between the first and the second side-plates, the intermediate riser, having a lesser stiffness, can be slightly deformed, because of the restoring system internal to the articulation mechanism, in order to bring the first and second side-plate in a correct positioning so as to fully lock the hinge mechanism. Further, it is possible to ensure the full locking of the articulation mechanism regardless the stiffness of the seatback frame. Note that the angular offset rectification being discussed is small, i.e. of the order of 1°.

The intermediate riser can be adapted for being rotationally deformed around the transverse axis in response the application of a torque around the transverse axis.

Thus, the restoring system internal to the hinge mechanism, combined with a reduced force from the occupant of the seat allows to make up the angular offset and thus to fully lock the hinge mechanism that was not yet fully locked. In particular, the occupant of the seat can easily exert such a moderate torque when their back is resting on the seatback frame.

The intermediate riser may be deformable between: a rest configuration in which the intermediate riser extends along a main direction of rectilinear extension in a first plane normal to the transverse axis; a deformed configuration in which a first portion of the intermediate riser, preferably located near the transverse axis, is flexed in a first plane normal to the transverse axis in response to the application of the torque around the transverse axis.

Such a bending of the intermediate riser in the first plane normal to the transverse axis allows the restoring system inside the not yet fully locked hinge mechanism to rotate the second side-plate relative to the first side-plate around the transverse axis in order to correct a possible angular offset between the second side-plate and the first side-plate compared to a relative locking position.

The intermediate riser may have, near the intermediate portion, a reduced dimension in a direction normal to the transverse axis and to the main direction of extension of the intermediate riser.

The reduced dimension near the first portion allows to improve the bending of the intermediate riser near this first portion. This also allows to induce a preferred direction of deformation of the intermediate riser, in particular in the first plane normal to the transverse axis.

In the deformed configuration, a second portion of the intermediate riser, located away from the transverse axis, can have a main direction of extension forming a bending angle with the main direction of extension of the intermediate riser in the rest configuration, where the bending angle is preferably included between 0° and 1°.

Such values allow sufficient rotation, around the transverse axis, of the second side-plate relative to the first side-plate in order to allow the full locking of the not yet fully locked hinge mechanism for any angular offset between the first side-plate and the second side-plate relative to the locking position. That also allows to avoid plastic deformation of the intermediate riser.

The stiffness in the intermediate riser, considered in response to a torque around the transverse axis, is less than or equal to 50 N·m·deg$^{-1}$.

Such a stiffness allows an easy deformation of the intermediate riser by an occupant of the seat. Such a stiffness is below the stiffness usually observed for the seat frame itself, in particular for large seatbacks, e.g. seatbacks for delivery vans or trucks.

The intermediate riser can be fixed at an upper end portion to the first lateral riser, and at a lower-end portion to the second side-plate of the first hinge mechanism.

In that way, distance between the attachment of the intermediate riser to the first lateral riser end of the first transverse axis is the highest. Because of that arrangement, the torque necessary for deforming the intermediate riser is reduced because of the large lever arm.

The intermediate riser may be fixed to the first lateral riser by welding.

The weld constitutes a robust and durable attachment means.

The first lateral riser may form a housing in which the intermediate riser is received.

Such a riser allows to keep a reduced bulk of the frame of the seatback in particular along the transverse direction Y.

In the resting configuration, the intermediate riser may be received in the housing of the first lateral riser with a clearance formed between the intermediate riser and a wall of the housing of the first lateral riser, in a direction normal to the transverse axis and to the main direction of extension of the intermediate riser.

The clearance formed allows the intermediate riser to be deformed inside the housing of the first lateral riser, with the wall of the housing forming a limit stop for deformation of the intermediate riser. Because of this limit by stops, the bending angle of the intermediate riser can remain in the elastic domain.

The first and second side-plates of the first hinge mechanism can be connected through at least one peripheral toothing (gearing).

The intermediate riser may have a hole centered on the transverse axis, where the second side-plate is received at least in part in the hole of the intermediate riser and where the intermediate riser forms a plurality of pins extending to the inside of the hole and engaging by complementary of shapes with the relief of the second side-plate in order to secure the intermediate riser and the second side-plate in rotation around the transverse axis.

The seatback frame may further comprise a second lateral riser, where the second lateral riser is mounted pivoting relative to the seat-bottom frame, around the transverse axis by means of a second hinge mechanism.

In other words, the second lateral riser may not have an intermediate riser, meaning a single intermediate riser may suffice. However, having an intermediate riser on each side is not excluded.

The invention claimed is:

1. A vehicle seat, especially for automotive vehicle, comprising:
    a seat-bottom frame;
    a seatback frame comprising at least one first lateral riser, where said lateral riser is mounted pivoting relative to said seat-bottom frame around a transverse axis;
    a first discontinuous type hinge mechanism interposed between the seat-bottom frame and the seatback frame with a first side-plate rigidly fixed to the seat-bottom frame and a second side-plate;
    wherein the seatback frame comprises an intermediate riser mounted on the seat bottom frame, pivoting around the transverse axis, by means of the first hinge mechanism in order to allow an adjustment of an angular position of the seatback frame relative to the seat bottom frame around the transverse axis;
    where the first lateral riser is mounted pivoting freely around the transverse axis relative to the seat-bottom frame and the intermediate riser and the second side-plate of the first hinge mechanism are securely connected in rotation around the transverse axis;
    where the intermediate riser is fixed to the first lateral riser at a distance from the transverse axis; and
    where the intermediate riser has a stiffness less than the stiffness of the first lateral riser of the seatback frame, said stiffness being considered in response to the application of a torque around the transverse axis.

2. The seat according to claim 1, wherein the intermediate riser can be deformed around the transverse axis in response the application of a torque around the transverse axis.

3. The seat according to claim 1, wherein the intermediate riser can be deformed between: a rest configuration in which the intermediate riser extends along a main direction of rectilinear extension in a first plane normal to the transverse axis; a deformed configuration in which a first portion of the intermediate riser, preferably located near the transverse axis, is flexed in a first plane normal to the transverse axis in response to the application of the torque around the transverse axis.

4. The seat according to claim 3, wherein the intermediate riser has, near the first portion, a reduced dimension in a direction normal to the transverse axis and to the main direction of extension of the intermediate riser.

5. The seat according to claim 3, wherein in the deformed configuration, a second portion of the intermediate riser, located away from the transverse axis, has a main direction of extension forming a bending angle with the main direction of extension of the intermediate riser in the rest configuration.

6. The seat according to claim 1, wherein the stiffness in the intermediate riser, considered in response to a torque around the transverse axis, is less than or equal to 50 $N \cdot m \cdot deg^{-1}$.

7. The seat according to claim 1, wherein the intermediate riser is fixed at an upper end portion to the first lateral riser, and at a lower-end portion to the second side-plate of the first hinge mechanism.

8. The seat according to claim 1, wherein the first lateral riser forms a housing in which the intermediate riser is received.

9. The seat according to claim 8, wherein, in the resting configuration, the intermediate riser is received in the housing of the first lateral riser with a clearance formed between the intermediate riser and a wall of the housing of the first lateral riser, in a direction normal to the transverse axis and to the main direction of extension of the intermediate riser.

10. The seat according to claim 1, wherein the seatback frame further comprises a second lateral riser, where the second lateral riser is mounted pivoting relative to the seat-bottom frame, around the transverse axis by means of a second hinge mechanism.

* * * * *